United States Patent [19]

Constant

[11] 4,107,458
[45] Aug. 15, 1978

[54] CIPHER COMPUTER AND CRYPTOGRAPHIC SYSTEM

[76] Inventor: James N. Constant, 1603 Danbury Dr., Claremont, Calif. 90027

[21] Appl. No.: 716,679

[22] Filed: Aug. 23, 1976

[51] Int. Cl.² .............................................. H04L 9/02
[52] U.S. Cl. ..................................... 178/22; 364/900
[58] Field of Search ......................................... 178/22

[56] References Cited

U.S. PATENT DOCUMENTS

| | | | |
|---|---|---|---|
| 3,515,805 | 6/1970 | Fracassi et al. | 178/22 |
| 3,614,316 | 10/1971 | Andrews, Jr. et al. | 178/22 |
| 3,639,690 | 2/1972 | Braun et al. | 178/22 |
| 3,639,690 | 2/1972 | Braun et al. | 178/22 |
| 3,649,915 | 3/1972 | Mildonian, Jr. | 178/22 |
| 3,711,645 | 1/1973 | Ehrat | 178/22 |
| 3,746,799 | 7/1973 | Gentges | 178/22 |
| 3,781,472 | 12/1973 | Goode et al. | 178/22 |
| 3,808,365 | 4/1974 | Ehrat | 178/22 |
| 3,876,832 | 4/1975 | Morgan et al. | 178/22 |
| 3,911,216 | 10/1975 | Bartek et al. | 178/22 |
| 3,962,539 | 6/1976 | Ehrsam et al. | 178/22 |
| 3,988,538 | 10/1976 | Patten | 178/22 |

OTHER PUBLICATIONS

"Encryption Algorithm for Computer Data Protection", *Federal Register*, vol. 40, No. 52, Mar. 17, 1975, pp. 12134–12139.

"Cryptography and Computer Privacy," Feistel, *Scientific American*, vol. 228, No. 5, May 73, pp. 15–23.

"Enciphering Data for Secure Transmission," Meyer, *Computer Design*, Apr. 1974, pp. 129–134.

"Is Your Computer Insecure?," Beardsley, *IEEE Spectrum*, Jan. 72, pp. 67–78.

"Protecting Data by Encryption," Sykes, *Datamation*, Aug. 1976, pp. 81–85.

"A Consideration of the Application of Cryptographic Techniques to Data Processing," Skatrud, Fall Joint Computer Conference, 1969, p. 111–117.

"Security Considerations in a Multi-Programmed Computer System," Peters, Spring Joint Computer Conference, 1967, p. 283–286.

"Systems Implications of Information Privacy," Petersen et al., Spring Joint Computer Conf., 1967, pp. 291–300.

"Some Cryptographic Techniques for Machine-to-Machine Data Communications," Feistel et al., Proceedings of IEEE, vol. 63, No. 11, Nov. 1975, pp. 1545–1554.

*Primary Examiner*—Howard A. Birmiel
*Attorney, Agent, or Firm*—Harris, Kern, Wallen & Tinsley

[57] ABSTRACT

A system for the protection of stored and transmitted data including a random access memory accessed by counters and used for encrypting and decrypting signals in a cryptographic system using stream and block ciphers.

32 Claims, 7 Drawing Figures

CIPHER COMPUTER AND CRYPTOGRAPHIC SYSTEM

BACKGROUND OF THE INVENTION

The present invention relates to the privacy of data used by modern computers and communication systems and more particularly to cryptography in which digital signals representing a clear text are changed to digital signals representing a ciphered text and vice versa.

Digital computers and communications systems are increasingly being used to store and transmit confidential data. The security and privacy of these systems calls for apparatus and method beyond those of the normal computing and communications functions of these systems and thereby increasing the overall systems costs. In the past, users of private data systems have gradually adopted a number of useful countermeasures to protect their systems and this activity has increased greatly since the passage of the Privacy Act of 1974 which requires that Federal use of computer files are now subject to stringent legislative constraints. The need for encryption is not only to satisfy the current legal requirements for privacy however but extends to protect data systems from criminal activities as well. Encryption is but one powerful countermeasure for combating a number of threats including the monitoring, misrouting, substitution, modification and injection of messages to and from terminals and their central processors. And, data files can also be safeguarded by using encryption techniques. This can all be seen in a number of publications including Refs [1]–[7].

When computer data is transmitted to a remotely located terminal, unauthorized access to it may be prohibited by using cryptographic encipherement in which the clear text data S is changed to enciphered text data $S_o$ related by $S_o = f(S, K)$ where $K$ is the key and $f$ is the cryptographic algorithm. Decipherement involves an inverse transformation yielding the clear text data sequence S from the cipher text data sequence $S_o$. The two basic methods or schemes for ciphering data are the so called stream and block cipher schemes. In both schemes the encipherement and decipherement of data are under control of the key K. Both schemes have certain advantages and disadvantages but the block cipher is now generally accepted as being the least susceptible to determining (breaking) the key and in fact the proposed standard algorithm is for a block cipher. The apparent advantage of block over stream ciphers is that the one-to-one correspondence between the clear and cipher text bits is avoided. Each bit of the block encryption affects all bits of the block decryption thus making analysis extremely difficult. Stream ciphers have been discussed in a number of publications including Refs [3], [8], [9] while block ciphers are discussed in Refs [10]–[12].

There are known in the prior art a variety of algorithms which can be used to produce ciphers. As a consequence, the computer privacy problem has been burdened by the lack of standardization. To alleviate this problem, the National Bureau of Standards is considering the adoption of an algorithm as a Federal information processing standard. The proposed technique has been disclosed in Refs [13], [14]. No doubt whether the NBS proposed standard is finalized or not it will serve as an initializing activity for further work to say the least. In any case, the prior art cryptographic devices, both stream and block, have been limited by their software and hardware implementations and costs.

Stream and block cipher systems in the prior art are known using both software and hardware. Stream devices are the simplest and least expensive but suffer the least strength of their ciphers while block devices are the most expensive but offer the potential for the highest strength of their ciphers. And, software systems are slow when compared to hardware systems. In particular, hardware implementations of the prior art have been obtained in the form of shift registers. Such devices can be assembled from conventional medium scale integrated (MSI) circuit logic or can be designed in large scale integrated (LSI) form. Thus, the digital implementation of cipher systems requires the high speed storage the readout of data in a number of shift registers. However, shift registers are limited in length and speed, and many similar devices are needed if much data is to be stored, for example when seeking to strengthen the cipher.

In many applications the data must be recycled in time. This is accomplished in the prior art by recirculating data through shift registers; the advantage of recirculation being the saving in hardware over the cascading of many similar shift registers. Of particular interest to the present invention is the delay time compressor (DELTIC) which recirculates in a number of recirculations. The DELTIC has been used for implementing a variety of digital devices, for example the digital matched filter and correlator of my patent Ref [15] and the digital time compressor of my copending application Ref [16].

The prior cipher art using recirculating shift registers utilize non-DELTIC implementations. The system of the present invention on the other hand is charactered through its preferred use of the DELTIC circuit using shift registers and RAMs as delay elements and in this manner for providing new and improved stream and block cipher devices while significantly decreasing the weight, size, power consumption and cost for such devices. From this discussion it is clear that in the past, the digital impelementation of a cipher device has been accomplished using shift registers, non-recirculating and recirculating non-DELTIC, and for all practical purposes has not been successful for increasing the capacity and speed of operation of such devices beyond a certain limit determined by the technology of shift registers. Furthermore, the prior art of digital hardware implementations falls short when the size and cost of shift registers are considered in devices requiring high throughputs.

It is the purpose of the present invention to produce cipher devices capable of exceeding the practical capacity and speed of present digital stream and block cipher devices by at least one order of magnitude, at reduced size and cost.

SUMMARY OF THE INVENTION

The system of the invention addresses the computer privacy problem using cryptography. For example, cryptographic or cipher devices can be used in a data processor and at remote terminals to insure the private storage and communication of data.

The invention provides both apparatus and method for the digital implementation of cipher devices. A random access memory (RAM) accessed sequentially by a counter is utilized to perform the function of a delay line in a preferred configuration.

The general purpose of this invention is to provide small size low cost apparatus for the digital implementation of high capacity high speed stream and block cipher devices. Utilizing the system of the present invention, the digital encipherment and decipherment of data may e accomplished efficiently and economically in real time.

Particular objectives of the invention are to provide a number of configurations of the system preferably using a RAM in a DELTIC loop circuit and thereby to provide new and improved cipher devices.

DESCRIPTION OF THE PREFERRED EMBODIMENTS

Figure 1:
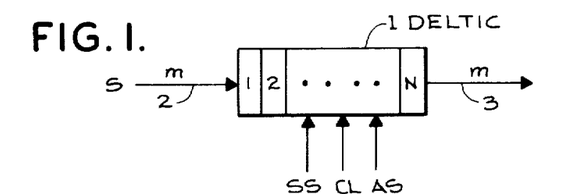
FIG. 1 is a modified DELTIC circuit loop utilized to recirculate signals in time.

Referring to FIG. 1, a modified DELTIC circuit loop 1 is utilized to recirculate signals S in time under control of sampling SS, clock CL, and address AS signals. A signal S appears on m lines at input 2 and steps through memory locations $n = 1, 2 \ldots N$ following N recirculations and then appears on m lines at output 3. Between samplings (inputtings) of signal S, the signal at output 3 is $S_n$ or, alternatively $S_N$. The term signal denotes a block or word of data, for example digits found at the output of an analog-to-digital converter.

Figure 2:
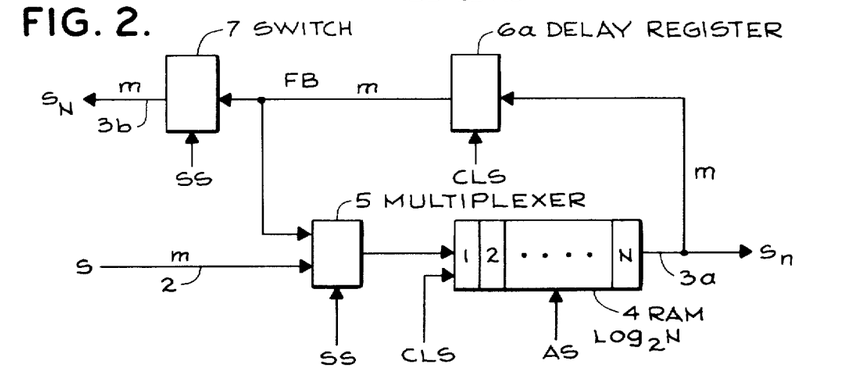
FIG. 2 is a more detailed block diagram of FIG. 1.

The modified DELTIC loop 1 is shown in FIG. 2 in more detail. The modification consists of replacing the computer type acoustic delay line memory usually associated with a conventional DELTIC loop by a RAM 4. In the present disclosure I will refer to the modified DELTIC loop as a DELTIC RAM, DELTIC ROM, and so forth to better indicate the present apparatus over the conventional DELTIC art. The conventional DELTIC loop has been described in a number of publications including Refs [17]–[18]. It should be understood that while the conventional use of a DELTIC circuit is to compress signals in time its use in the present invention is to store signals in a number of recirculations wherein the signal may change from recirculation-to-recirculation. Thus, while the conventional use of a DELTIC loop is for delaying and time compressing signals, the preferred use of this circuit in the system of the invention is for delaying and changing (encrypting and decrypting) signals.

Referring to FIG. 2, an analog signal which has, for example, been digitized to m levels where $m = 1, 2 \ldots$, i.e., a signal block or word having m digits, appears on m lines as signal S at 2 and is gated through multiplexer 5 to RAM 4. Thus, multiplexer 5 when commanded by sampling signal SS inserts signal S into RAM 4 which normally receives feedback signal FB on each clock signal CLS. It will be recognized that the procedure of FIG. 2 follows the operation of a conventional DELTIC loop in which RAM 4 plays the role of a delay line. Typically, for certain selections of RAM 4, when clock CLS is LOW, write enable lines in RAM 4 are enabled and signal S in the form of an m-bit block or word is written into the selected location of RAM 4. When the clock CLS goes HIGH, an address counter increments selecting the next address AS which appears on $\log_2 N$ lines. The m-line outputs at 3a are fed back to the inputs of RAM 4 as feedback signal FB through a delay register 6a and multiplexer 5 which inhibits signal FB only when signal S is being sampled. Following the sampling of signal S, N recirculations of previously stored signals appear at the output 3a as signals $S_n$, where $n = 1, 2 \ldots N$. The systems of FIGS. 1 and 2 are those of my copending application REF [16] for the time compression of signals. However, in the present invention these will be used not for the time compression of signals but for delaying and preferably changing the contents of signals as will become more apparent during the course of this disclosure. In particular, the systems of FIGS. 1 and 2 will be used for delaying signals and recovering delayed signals following N recirculations between samplings of signal S. Thus, the systems of FIGS. 1 and 2 may serve as time compressors and delay lines in some embodiments of the invention. Specifically, the DELTIC loop of FIG. 2 may be augmented by feeding the m-line outputs from delay register 6a to a gate or switch 7 which is under control of sampling signal SS for inhibiting signals FB except the last recirculating signal $n = N$ is passed so that the output of switch 7 is the signal $S_N$, i. e., signal S appears at the output of switch 7 as signal $S_N$ after N recirculations of DELTIC loop 1. And, while switch 7 has been disclosed for sampling $n = N$ and providing output $S_N$ it may be programmed for sampling any n and providing output for that n as desired. The system of FIG. 2 may be used with or without switch 7 in which cases outputs may be taken at 3a or 3b as desired, i. e., operating as a time compressor or delay line.

Figure 3:
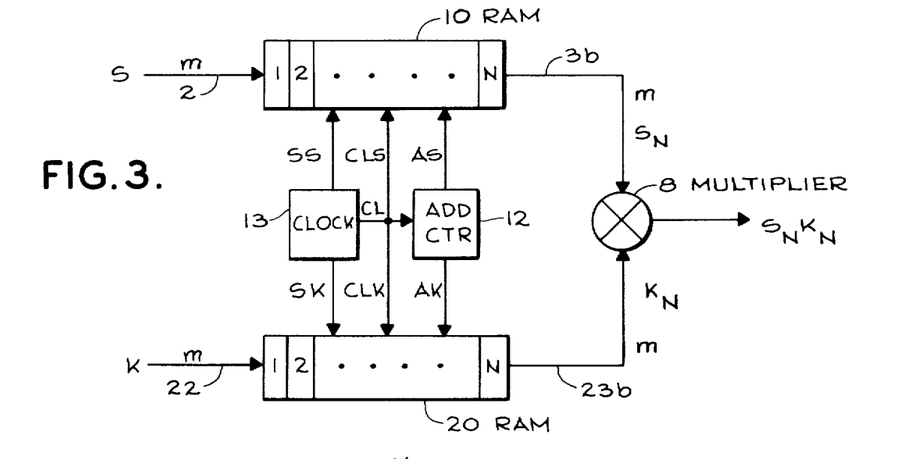
FIG. 3 is a stream cipher device of the invention based on the system of FIG. 1.

Referring to FIG. 3 is shown a stream cipher device of the invention in which RAMs 10 and 20 are arranged to store N samples, i.e., blocks or words of signals S and K where S is the clear (cipher) text and K is the key. In particular, RAMs 10 and 20 may be in the form of the system of FIG. 1. Between samplings of signal S, signals $S_N$ and $K_N$ appear as inputs to multiplier 8 which may be be a modulo2 adder or exclusive-OR (EXCl-OR) multiplier, i.e., a single multiplier or m multipliers (one for each bit of the block or word) may be utilized. The output of multiplier 8 is the signal $S_N K_N = f(S, K)$ where the function f is the cryptographic algorithm used for the stream cipher, for example using the Vigenere and Vernam ciphers described in detail in Ref [19]. Thus, inserting the clear (cipher) signal at 2 and key signal K at 22 will produce signals $S_N K_N$, for each sampling of signal S, at the output of multiplier 8 with $S_N K_N$ representing the cipher (clear) text of signal S as the case may be. It will be appreciated that while the system of FIG. 3 has been disclosed with switches 7 included in RAMs 10 and 20, i.e., using the output 3b of the system of FIG. 2, the system of FIG. 3 will work equally well by eliminating switches 7 in RAMs 10 and 20 and providing a single switch (not shown) following multiplier 8, i.e., using the output 3a of the system of FIG. 2. In either implementation, inputting signals S and K will produce the stream cipher signal $S_N K_N$.

In general, RAM 10 may be in the form of a simple RAM, DELTIC RAM, shift register (SR), DELTIC SR, charge-coupled device (CCD), DELTIC CCD, and so forth while RAM 20 may be one of these or a read-only memory (ROM), programmable read-only memory (PROM), or simply a set of bipolar signals applied to one input of multiplier 8, the other input to multiplier 8 being provided by RAM 10. In fact, it will be appreciated that while the present disclosure is made in terms of digital elements it can be implemented equally well using analog elements. For example, the system of FIG. 3 can be implemented by specifying the use of conventional analog delay lines including acoustic surface wave devices (SAW) replacing RAMs 10 and 20; the invention requirement being for the use of a DELTIC circuit. And, address counter 12 and clock 13 may not be needed for many such implementations of the invention. Thus RAMs 10 and 20 may be any one of a number of types, the exact type being determined by the application. RAMs 10 and 20 are organized N-words (blocks) by $m$-bits and are arranged to operate as serial-in serial-out shift registers. An example of the use of a RAM as a shift register is given in Ref [20]. In the following RAMs 10 and 20 will be assumed to be DELTIC RAMs although their exact specification will be determined by the application. With this assumption, RAMs 10 and 20 are accessed by address counter 12. On each clock CL, address counter 12 shifts one place thus selecting a different word $n = 1, 2 \ldots N$ in DELTIC RAMs 10 and 20. The address cycle is completed after N shifts and is under control of the computer or clock 13 which also provides timing and sampling by way of clock signals CLS, CLK and sampling signals SS, SK. An analog signal which has previously been digitized to $m$ level at the rate SS appears on $m$ lines at 2 while a second signal K is applied on $m$ lines at 22. The clock, sampling and addressing signals CLS, CLK, SS, SK, AS, AK are determined by the application. Clock signals CLS, CLK are determined by the system capacity and speed. Sampling signals SS, SK may be some frequency fraction of the clock rate CL and generally are determined by sampling requirements for signals S and K. Finally, address signals AS, AK are determined by the word size of RAMs 10 and 20.

Using some RAMs, for example the SN 7489 (Texas Instruments), AM 27503 (Advanced Micro Devices), 310 IT (Intel), $\mu$A 9103 (Fairchild Semiconductor), NA 7599 (National Semiconductor) and so forth, the operation proceeds in a manner such that when clock CL is LOW write enable lines in the RAMs are enabled by clock signals CLS, CLK and the digitized signals S, K are written into selected locations of RAMs 10 and 20. When the clock CL goes HIGH, address counter 12 increments selecting the next address while RAMs 10 and 20 go into the READ mode. Other RAMs, for example the Signetics model 82S21 will accept signals while their contents are being read. Thus, on each shift of address counter 12, the information stored in RAMs 10 and 20 is supplied to switches 7 which gate signals $S_N$, $K_N$ to multiplier 8 which may be in the form of a half-adder (EXCL-OR) or full adder which then multiplies signals to produce the product $S_N K_N$ for each sampling of signal S. It will be appreciated that while the invention in a preferable configuration employs a DELTIC RAM it will operate equally well using a RAM, shift register, CCD and so forth. It will also be recognized by those in the art that the present invention implements the signal S and key K elements of a cipher device using RAMs in the role of delay registers. In summary, the present invention implements cipher devices using RAMs.

Once loaded into their respective RAMs 10 and 20 signals S and K may be multiplied at the clock rate CL in a multiplier 8 to produce the product $S_n K_n$ which when gated by a switch (not shown) produces the enciphered (deciphered) product $S_N K_N$ (when using the 3$a$ output of FIG. 2), or signals S and K may be multiplied at the sampling rate SS in multiplier 8 to produce the enciphered (deciphered) product $S_N K_N$ as shown in FIG. 3 (when using the 3$b$ output of FIG. 2). It should be understood in FIG. 3 that the operation of RAMs 10 and 20 may not be necessarily identical, the difference being that while RAM 10 continuously updates (samples) signal S by delaying signals $S_n$ in delay register 6$a$ and multiplexer 5, no such delaying and multiplexing are required in RAM 20 when this circuit is used as a fixed reference (key). Thus, the delay register 6$a$ and multiplexer 5 required for operation as a DELTIC RAM are not needed once reference (key) signal K has been loaded into DELTIC RAM 20 for use as a fixed key. Also, it should be understood that all operations involving complex arithmetic are to be carried out in parallel, for example as shown in Ref [21].

It should be understood that address codes AS and AK are applied to RAMs 10 and 20 on $\log_2 N$ lines. It should also be understood that signals S and K are applied on m lines to their respective RAMs 10 and 20 the outputs of which are also carried on m lines. However, it will be appreciated that the block or word sizes of signals S and K while indicated equal may be unequal if desired. Also, it should be understood that not all embodiments of the invention will require an address counter 12 and clock 13.

The system of the present invention can be operated as either a fixed or programmable cipher device. When used as a fixed device, the desired key K is loaded into RAM 20 which may be in the form of a DELTIC or non-DELTIC RAM, ROM PROM and left undisturbed for the duration of the processing (enciphering or deciphering). However, the system of the present invention is particularly suited for applications in which the key K must frequently be changed. The change is made by loading a new key K into RAM 20 and, as before, introducing signal S which is to be processed (enciphered or deciphered) into RAM 10. In this mode of its operation the present invention constitutes a programmable ciphering device. In practical terms, the difference between a fixed and programmable device is in the way key K is implemented for processing (enciphering or deciphering) signal S. If K is built into the system it becomes a fixed device while if K is applied as desired to the system it becomes a programmable device.

Figure 4:
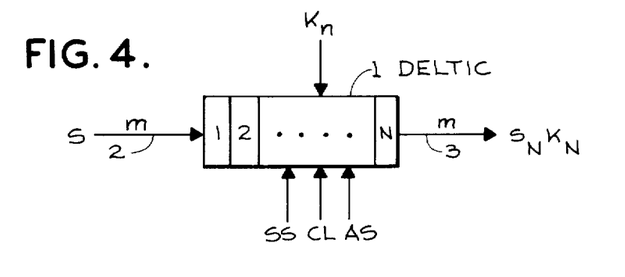
FIG. 4 is an alternative embodiment of the system of FIG. 1 used to recirculate and change signals in time.

FIG. 4 is an alternative embodiment of the system of FIG. 1 and is used to recirculate and change signals in time under control of sampling SS, clock CL, address AS, and key K signals. A signal S appears on m lines at input 2 and steps through memory locations $n = 1, 2 \ldots N$ following N recirculations and then appears on m lines at output 3. Between samplings (inputtings) of signal S, the N recirculations produce cipher signal $S_N K_N$.

Figure 5:
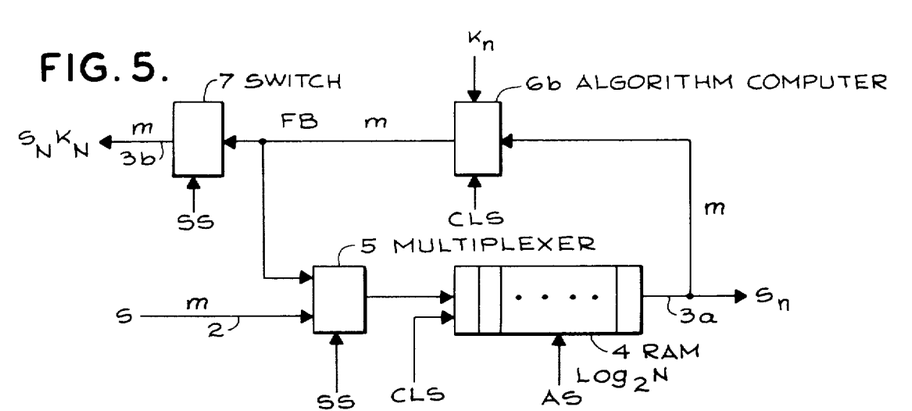
FIG. 5 is a more detailed block diagram of FIG. 4.

The system of FIG. 4 is shown in more detail in FIG. 5. Except for its substitution of algorithm computer 6$b$ replacing delay register 6$a$ the systems of FIGS. 2 and 5 are otherwise identical. While the function of delay register 6$a$ in FIG. 2 is to shift signals between recirculations, the function of algorithm computer 6$b$ in FIG. 5 is to shift (delay) and change signals between recirculations. Thus, while the conventional use of a DELTIC loop is for delaying and time compressing signals, the preferred use of this circuit in the present invention is for delaying and changing (enciphering or deciphering) signals in a number of recirculations. Signal S at 2 represents clear (cipher) text which is to be enciphered (deciphered) while signal $S_N K_N$ at 3 represents cipher (clear) text which has been enciphered (deciphered). Signal K represents the key for determining the relationship $S_N K_N = f(S, K)$ where $f$ is the cryptographic algorithm of the block cipher.

Referring to FIG. 5 an analog signal which has, for example, been digitized to $m$ level where $m = 1, 2 \ldots$, i.e., a signal block or word having $m$ digits, appears on $m$ lines as signal S at 2 and is gated through multiplexer 5 to RAM 4. Thus, multiplexer 5 when commanded by sampling signal SS inserts signal S into RAM 4 which normally receives feedback signal FB on each clock signal CLS. It will be recognized that the procedure of FIG. 5 follows closely the procedure of FIG. 2. Thus, following the sampling of signal S, N recirculations of previously stored signals appear at the output 3a as signals $S_n$ where $n = 1, 2 \ldots N$. Signals $S_n$ are inputted to algorithm computer 6b whose output is feedback signal FB. In this manner, signals appearing at the output of algorithm computer 6b are delayed and changed by the key K and cryptographic algorithm $f$. And, the present invention implements the DELTIC circuit for changing as well as for delaying signals on each recirculation. In particular, the systems of FIGS. 4 and 5 will be used for delaying and changing signals in N recirculations between samplings of signal S. At this point it will be recognized that the systems of FIGS. 4 and 5 are implementations of a cipher computer and block cipher device of the invention; all that is needed is the circuit for the key K for providing the block cipher, corresponding to the circuit of RAM 20 for the key K to the stream cipher of the system of FIG. 3.

Figure 6:
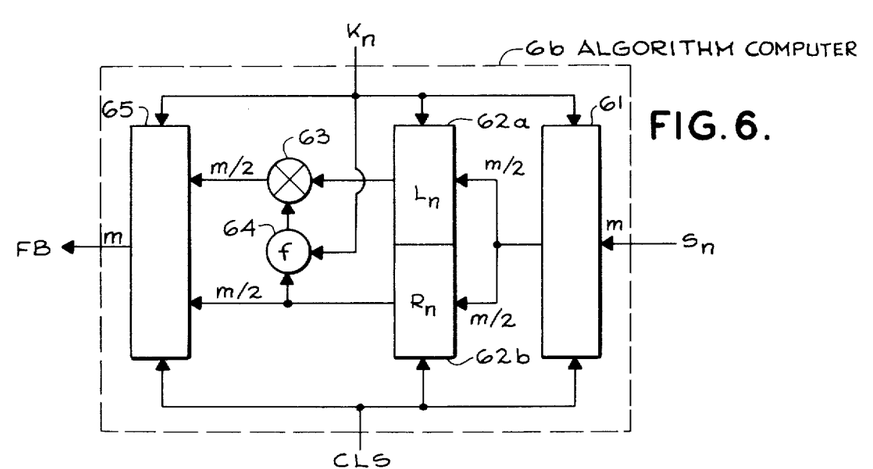
FIG. 6 is a more detailed block diagram of the algorithm computer portion of the system of FIG. 5.

FIG. 6 shows by way of example a block diagram of the algorithm computer 6b of FIG. 5. The algorithm scheme is that suggested by the proposed national standard discussed in detail in Refs [10]–[14]. In the example of FIG. 6 signal $S_n$ on $m$ lines in a given recirculation passes through a permutation multiplexer 61 which comprises simple wire crossings and which may be under key $K_n$ control for changing its permutations. The signal from permutation multiplexer 61 is divided equally on $m/2$ lines each being inputted to left and right parallel-in parallel-out shift registers $L_n$ 62a and $R_n$ 62b which may also be under key $K_n$ control for changing their transpositions of contents as desired. Outputs from registers 62a and 62b are inputted to modulo-2 adders or EXCL-ORs 63 and function computers 64 and to a switch multiplexer 65 as shown which may also include a permutation multiplexer if desired. Thus, modulo-2 adders 63 are for multiplying their inputs from register 62a and function $f$ computers 64 and providing output as input to switch multiplexer 65 as shown. Function $f$ computer 64 comprises a number of substitution units comprising decoders having $k$-bit input and $2^k$-bit outputs connected to $2^k$-bit line encoders having $k$-bit outputs with $k$ being a small fraction of $m$ as desired, for example as shown in Ref [14]. Finally, switching multiplexer 65 is under control of clock signal CLS or sampling signal SS as desired for switching inputs as required by the algorithm. The circuit computes $S_{n+1} = f(S_n, K_n)$, i.e., changes signal $S_n$ to signal $S_{n+1}$ in a single recirculation of the DELTIC loop and under control of the key and algorithm functions $K_n$ and $f$ for each recirculation $n = 1, 2 \ldots N$. It will be recognized that the system of FIG. 6 is a single stage of the proposed standard algorithm of Ref [13]. Thus, following N recirculations, a clear text signal S steps through $n = 1, 2 \ldots N$ memory locations and is recovered at 3 as cipher text signal $S_N K_N$. And, with key reversal, a cipher text signal $S_o = S_N K_N$ steps through $n = 1, 2 \ldots N$ memory locations and is recovered at 3 as the clear text signal S.

Figure 7:
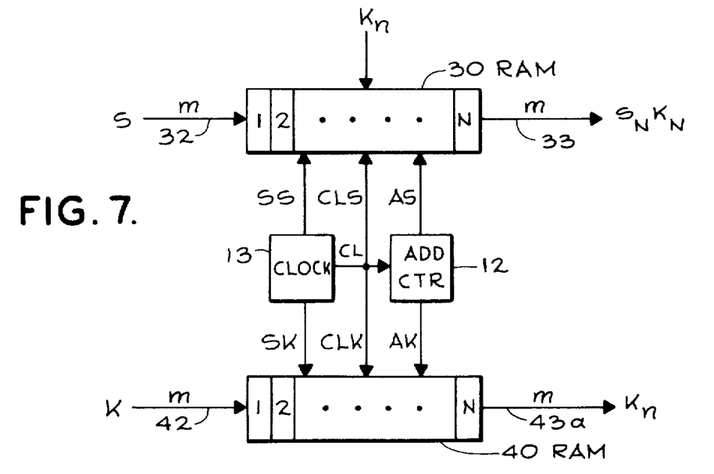
FIG. 7 is a block cipher device of the invention based on the system of FIG. 4.

Referring to FIG. 7 is shown a block diagram of a block cipher device of the invention in which RAMs 30 and 40 are arranged to store N samples, i.e., blocks or words of signals S and K where S is the clear (cipher) text and K is the key. In particular, RAM 40 may be in the form of the systems of FIGS. 1 and 4 but is shown in the form of FIG. 1 by way of example. And, RAM 30 may be in the form of the system of FIG. 4. Between samplings of signal S, signals $S_n$, $K_n$ where $n = 1, 2 \ldots N$ appear as inputs to algorithm computer 6b in RAM 30 and the output of algorithm computer 6b is the signal $S_{n+1} = f(S_n, K_n)$ where the function $f$ is the cryptographic algorithm used for the block cipher, for example using the proposed national standard described in detail in Ref [13]. Thus, inserting clear (cipher) signal at 32 and key signal K at 42 will produce signals $S_N K_N$ for each sampling of signal S at the output 33 of RAM 30 with $S_N K_N$ representing the cipher (clear) text of signal S as the case may be. It will be appreciated that while the system of FIG. 7 has been disclosed having RAMs 30 and 40 in the forms of the systems of FIGS. 1 and 4 respectively these may be reversed, i.e., having RAMs 30 and 40 in the forms of the systems of FIGS. 4 and 1 respectively. And, having RAMs 30 and 40 both in the form of the system of FIG. 4 is possible, And the disclosure of the elements of FIG. 3 may apply equally well to the implementing of elements of FIG. 7. And, the system of FIG. 7 can be operated either as a fixed or programmable cipher device as discussed in the case of FIG. 3. And, the cascading and paralleling of devices of FIGS. 3 and 7 to produce unbreakable ciphers is possible. And, a number of algorithms f and corresponding implementations for the algorithm computer 6b are possible.

Any one of the many possible modes of operation suggested by the stream and block systems of FIGS. 3 and 7 produces the ciphering of the input text at the output of the device as desired. In particular, the total number of recirculations is N for the stream and block devices and the total number of operations per recirculation is 1 (for delay) and P (for delay and changing the signal) where P is greater than 1. For example P = 5 (keyed transposition, key addition, keyed non-linear transformation, permutation, and convolution) when implementing the particular algorithm of Ref [12] in algorithm computer 6b. Thus, NP operations are needed for ciphering signals in the instant example which implements algorithm computer 6b in but one of many possible ways including the system of FIG. 6. While conventional cipher devices employ N × 1 shift registers (non-DELTIC), the system of the present invention utilizes the N × $m$ memory system of a RAM to obtain further capacity, speed, size, and cost improvements over the prior art. As is the case with shift registers, RAMs also can be assembled from readily available MSI circuit logic or can be specially designed in LSI form. In MSI form both types of devices are limited in size and many units are needed if large N- word and m-bit capacities are to be achieved. However, unlike the shift register, the word length of a RAM is less speed dependent while its contents are under control of clock 13 signal CL, sampling signal SS, and address signal AS, thus offering a wide variety of combinations for these parameters. On a per bit bases, the size and cost of a RAM is considerably less than that for a shift register. For example, the SN 7489 64-bit TTL RAM costs 25% more than the SN 74164 8-bit TTL shift register. Both these devices have the same size so the conclusion is that eight times more capacity can be achieved by using a typical commercially available RAM over a shift register at only a slight increase in cost. On the other hand, present RAM speeds at 100 MHz now exceed shift register speeds by a factor 10. It is to be expected therefore that the cipher devices of the present invention will increase both the capacity and speed of such devices while decreasing their size and cost by at least one order of magnitude. As example of the efficiency of the present invention for implementing the block cipher system of FIG. 7 for the proposed standard (N = 16 and m = 64) requires the following elements assembled MSI and using commercially available chips off-the-shelf:

| RAM 30 | | |
|---|---|---|
| | 1 - 16 × 64 bit (1K) RAM | 16 chips |
| | 2 - 64 bit multiplexers | 32 chips |
| | 4 - 32 bit parallel-in parallel-out shift registers | 16 chips |
| | 1 - 32 bit EXCL-OR | 4 chips |
| | 1 - 32 bit decoder/encoder | 8 chips |
| | 1 - 64 bit multiplexer | 16 chips |
| | | 92 chips |
| RAM 40 | | |
| | 1 - 16 × 64 bit (1K) RAM | 16 chips |
| | 2 - 64 bit multiplexers | 32 chips |
| | 1 - 64 bit parallel-in parallel-out shift register | 8 chips |
| | | 56 chips |
| | Clock 13 and address counter 12 | 6 chips |

Thus, a total of 154 chips are needed to implement a fully programmable block cipher device of the proposed standard and these can be assembled on a small card which arrangement is at least one order of magnitude less than for prior art block cipher devices. And, a fixed (non-programmable) device can be obtained by eliminating the 56 chips needed for implementing ROM 40. And, further savings are possible if the design is made in LSI. Moreover, the speed for this device would be limited only by the accessing of RAMs 30, 40 and algorithm computer 6b since the accessing of multiplexer 5, switch 7, and delay register 6a are small by comparison. Assuming the access times of RAMs, 30, 40 and algorithm computer 6b are 100 nanoseconds, the device of the example would require about 100 nanoseconds per recirculation so that the ciphering operation is carried out in 16 × 100 = 1,600 nanoseconds or 1.6 microseconds which is at least one order of magnitude faster than the known block cipher devices. These then are the results of the present invention.

The distinguishing feature of the present invention is the preferred use of a RAM in a DELTIC or non-DELTIC circuit to perform the function of a delay line for the implementation of a ciphering device. Thus, while a clock 13 may be used to provide sampling SS, SK and clock signals CLS, CLK using shift registers in the prior art, the use of a RAM in the present invention also requires the use of an address counter 12 for addressing RAMs 10, 20, 30, 40. Under control of clock signal CL, address counter 12 steps through address sequence $n =$ 1, 2 . . . N. At each location the clock signal CLS or CLK, applied to a memory moves signals, first, from the memory to its output and, second, from its input to the location in the memory being addressed. The clock signal therefore controls accessing to and from the memory and, through address counter 12, addressing the memory. It also controls updating or sampling of signals S and K with signals SS and SK which are used to gate signals from the outside world to each element of the system. And, the clock signal controls the shifting of delay register 6a and algorithm computer 6b.

In many applications it is desirable to combine the central executive control afforded by a computer with the efficiency and economy provided by special purpose signal processing devices. Such applications might require operations which include the encipherement and decipherement of data in computers or between computers and their terminals. Hardware cipher devices are special purpose signal processing devices which perform ciphering operations at rates in excess of the capabilities of large general purpose computers. Their applications include and are well suited for the encryption of signals in digital communications networks and the protection of sensitive exchanges between central processors and their terminals, for example in banking, retail point-of-sale, credit verification, personnel files, and medical files, and other applications. Options for the implementation of cipher devices include both analog and digital means, their full potential being limited by the technical efficiency and economic availability of hardware. Digital means in particular offer outstanding practical implementations in many applications and will no doubt find use in such sophisticated ciphering tasks as stream and block cipher devices and scramblers. While the present disclosure has been made in terms of digital devices it will be readily appreciated that their architectures are common in analog devices and, therefore, the invention can be implemented using analog devices equally well. For example, RAMs 10, 20, 30, 40 may be specified as CCDs whereupon signals S and K are analog. Or, in another example, delay lines 10, 20, 30, 40 may be implemented more generally as one of acoustic means or non-acoustic means. Included in the former category are sonic, magnetostrictive, acoustic surface wave, and optoacoustic filters, while the latter category comprises CCDs and SRs. Acoustic filters have been described in Refs [22]–[23] while non-acoustic filters have been described in Refs [24]–[26]. As a rule if interruptions of the processing (enciphering or deciphering) are infrequent then acoustic filters are preferred since thay offer large storage capacity, convenient tapping of delay lines, and lower power dissipation. When short duration interruptions of the signal processing may occur then CCDs with their controllable clock rates offer the advantages of small size, offset only by charge transfer inefficiency and temperature sensitivity. When frequent processing (enciphering and deciphering) interrupts are required then digital implementations in the form of shift registers and RAMs are indicated. The rapid development however of digital technology greatly favors digital devices and these then are preferred for implementing the cipher devices of the invention. In particular, the system of the invention is expected to make dramatic reductions in the complexity and cost and increase in the speed of ciphering signals and in the substantial reduction of the computer power in applications involving the privacy of stored and transmitted data.

Although several particular configurations of stream and block cipher devices have been described it should be understood that the scope of the invention should not be limited by way of illustration but by the appended claims.

REFERENCES

[1] Petersen and Turn "System implications of information privacy" 1967 SJCC AFIPS Conf Proc vol 30 Washington DC: 1967 pp 291-300 Thompson

[2] "The Consideration of Data Security in a Computer Environment" 1969 Form 52- -2169 IBM Corp White Plains NY

[3] Friedman "The authorization problem in shared files" 1970 vol 9 pp 258-280 IBM Sys J

[4] Carroll and McLelland "Fast infinite-key privacy transformation for resource-sharing systems" 1969 FJCC vol 35 AFIPS Conf Proc Montvale NJ: 1969 pp 223-230 AFIPS Press

[5] Peters "Security considerations in a multi-programmed computer system" 1967 SJCC vol 30 AFIPS Conf Proc Washington DC: 1967 pp 283-286 Thompson

[6] Beardsley "Is your computer insecure?" January 1972 IEEE Spectrum

[7] Menkes "Users need to do more than talk about security" July/August 1976 Data Communications

[8] Baran "On distributed communications" August 1964 vol IX Rand Corp Rep

[9] Skatrud "A consideration of the application of cryptographic techniques to data processing" 1969 FJCC vol 35 AFIPS Conf Proc Montvale NJ: 1969 pp 111-117 AFIPS Press

[10] Feistel "Cryptography and computer privacy" May 1973 Scientific American

[11] Meyer "Enciphering data for secure transmission" April 1974 Computer Design

[12] Feistel et al. "Some cryptographic techniques for machine-to-machine data communication" November 1975 Proc IEEE

[13] Federal Register "Encryption algorithm for computer data protection" March 17, 1975

[14] Sykes "Protecting data by encryption" August 1976 Datamation

[15] U.S. Pat. No. 3,950,635

[16] Ser. No. 479,872 filed June 17, 1974, now U.S. Pat. No. 3,950,635, and Ser. No. 609,342 filed Sept. 2, 1975, a division of Ser. No. 479,872, now abandoned, and Ser. No. 752,155 filed Dec. 20, 1976, a continuation-in-part of Ser. No. 609,342

[17] Rosenbloom "Using time compression techniques in digital correlation" Mar. 10, 1961 Electronics

[18] Anderson "The Deltic correlator" January 1965 Tech Memo 37 Acoustic Res Lab Harvard Univ

[19] "Generation of key in cryptographic system for secure communications" July 1976 Computer Design

[20] Springer "Higher speed shift registers use TTL RAMs and counters do all the shifting" Sept. 1, 1973 p 146 Electronic Design

[21] Whitehouse et al. "High speed serial access linear transformation implementations" January 1973 Naval Undersea Center San Diego CA 92132

[22] Squire et al. "Linear signal processing and ultrasonic transversal filters" November 1969 IEEE Trans on Microwave Theory and Techniques

[23] Holland and Claiborne "Practical acoustic wave devices" May 1974 IEEE Proc

[24] Byram et al. "Signal processing device technology" Aug. 21-Sept. 1, 1972 Proc NATO Advanced Study Institute held at the Univ of Technology Loughborough UK

[25] Kosonocky "Introduction to charge coupled devices" Tech Session 2 Sept. 10-13, 1974 WESCON Los Angeles

[26] Buss et al. "Introduction to charge coupled devices" Tech Session 2 Sept. 10-13, 1974 WESCON Los Angeles

I claim:

1. In a system for the implementation of a cipher computer and cryptographic system, the combination of:

a first memory means for storing a first signal S, said first memory means having storage locations for $n$ words $S_n$;

a second memory means for storing a second signal K, said second memory means having storage locations for $n$ words $K_n$;

crypto means having as input the stored outputs $S_n$, $K_n$ of said first and second memory means and providing at its output the cipher product of said first and second signals, with said stored outputs $S_n$, $K_n$ representing at least one of delayed, encrypted, and decrypted signals S, K and with said cipher product representing the cipher function $f(S, K) = S_n K_n$ where the subscript $n$ indicates that n delay operations by said first and second memory means and $n$ encrypting operations including at least one of multiplying, permuting and substituting by said crypto means have been performed on said first signal S using said second signal K to obtain the output cipher function $f(S, K)$ as one of stream and block ciphers, said crypto means including one of a multiplier and algorithm computer, where said multiplier encrypts a stream cipher function $f(S, K)$ and said algorithm computer encrypts a block cipher function $f(S, K)$; and recirculation means providing a feedback path from one of the output of said first and second memory means and said crypto means to the input of one of said first and second memory means and including DELTIC feedback means in the form of a delay register.

2. The system of claim 1 wherein said first and second memory and crypto means are analog menas.

3. The system of claim 1 wherein said first and second memory and crypto means are digital means.

4. The system of claim 1 including:

an address counter connected to said first and second memory means for addressing n storage locations of said memory means in a sampling interval providing $n$ outputs; and clock means connected to said first and second memory means and to said address counter, including means for shifting signals in at least said first memory means after each sampling interval.

5. The system of claim 4 wherein said clock means includes means for shifting signals in said second memory means after each sampling interval.

6. The system of claim 1 wherein said crypto means computes the encryption algorithm gives in the Federal Register Mar. 17, 1975.

7. The system of claim 1 wherein said crypto means computes the encryption algorithm of Vernam's cipher.

8. The system of claim 1 wherein said memory means are RAMs.

9. A method for the implementation of a cipher computer and cryptographic system including the steps of:
  storing first signal S in first memory means having storage locations for $n$ words $S_n$;
  storing second signal K in second memory means having storage locations for $n$ words $K_n$;
  forming the cipher product of said first and second signals said stored words $S_n$, $K_n$ representing at least one of delayed, encrypted, and decrypted signals S, K, and,
  said cipher product representing the cipher function $f(S, K) = S_n K_n$ where the subscript $n$ indicates that $n$ delay operations by said first and second memory means and $n$ encrypting operations, including at least one of permuting, substituting, and multiplying, have been performed on the first signal S using said second signal K to obtain the output cipher function as one of stream and block ciphers,
  with the step of forming the cipher product including one of multiplying for encrypting a stream cipher function, and computing an algorithm for encrypting a block cipher function; and
  recirculating the output of one of said first and second memory means and said crypto means as an input to one of said first and second memory means through a DELTIC feedback loop incorporating delay register.

10. The method of claim 9 including analog storing of signals.

11. The method of claim 9 including digital storing of signals.

12. The method of claim 9 including the steps of:
  accessing said memory means with an address counter; and
  timing the operation of said memory means with a clock.

13. The method of claim 9 including the step of shifting signals in at least one of said memory means after each sampling interval.

14. The method of claim 9 including the step of computing the encryption algorithm given in the Federal Register Mar. 17, 1975.

15. The method of claim 9 including the step of computing the encryption algorithm of Vernam's cipher.

16. The method of claim 9 including the step of storing the signals in a RAM.

17. In a system for the inmplementation of a cipher computer and cryptographic system, the combination of:
  a first memory means for storing a first signal S, said first memory means having storage locations for $n$ words $S_n$;
  a second memory means for storing a second signal K, said second memory means having storage locations for $n$ words $K_n$;
  crypto means having as input the stored outputs $S_n$, $K_n$ of said first and second memory means and providing at its output the cipher product of said first and second signals,
  with said stored outputs $S_n$, $K_n$ representing at least one of delayed, encrypted, and decrypted signals S, K, and with said cipher product representing the cipher function $f(S, K) = S_n K_n$ where the subscript $n$ indicates that $n$ delay operations by said first and second memory means and $n$ encrypting operations including at least one of multiplying, permuting and substituting by said crypto means have been performed on said first signal S using said second signal K to obtain the output cipher function $f(S, K)$ as one of stream and block ciphers,
  said crypto means including one of a multiplier and algorithm computer, where said multiplier encrypts a stream cipher function $f(S, K)$ and said algorithm computer encrypts a block cipher function $f(S, K)$; and
  recirculation means providing a feedback path from one of the output of said first and second memory means and said crypto means to the input of one of said first and second memory means and including DELTIC feedback means in the form of an algorithm computer.

18. The system of claim 17 wherein said first and second memory and crypto means are analog means.

19. The system of claim 17 wherein said first and second memory and crypto means are digital means.

20. The system of claim 17 including:
  an address counter connected to said first and second memory means for addressing $n$ storage locations of said memory means in a sampling interval providing $n$ outputs; and
  clock means connected to said first and second memory means and to said address counter, including means for shifting signals in at least said first memory means after each sampling interval.

21. The system of claim 20 wherein said clock means includes means for shifting signals in said second memory means after each sampling interval.

22. The system of claim 17 wherein said crypto means computes the encryption algorithm given in the Federal Register Mar. 17, 1975.

23. The system of claim 17 wherein said crypto means computes the encryption algorithm of Vernam's cipher.

24. The system of claim 17 wherein said memory means are RAMs.

25. A method for the implementation of a cipher computer and cyrptographic system including the steps of:
  storing first signal S in first memory means having storage locations for $n$ words $S_n$;
  storing second signal K in second memory means having storage locations for $n$ words $K_n$;
  forming the cipher product of said first and second signals said stored words $S_n$, $K_n$ representing at least one of delayed, encrypted, and decrypted signals S, K, and,
  said cipher product representing the cipher function $f(S, K) = S_n K_n$ where the subscript n indicates that $n$ delay operations by said first and second memory means and $n$ encrypting operations, including at least one of permuting, substituting, and multiplying, have been performed on the first signal S using said second signal K to obtain the output cipher function as one of stream and block ciphers,
  with the step of forming the cipher product including one of multiplying for encrypting a stream cipher function, and computing an algorithm for encrypting a block cipher function; and
  recirculating the output of one of said first and second memory means and said crypto means as an input to one of said first and second memory means through a DELTIC feedback loop incorporating an algorithm computer.

26. The method of claim 25 including analog storing of signals.

27. The method of claim 25 including digital storing of signals.

28. The method of claim 25 including the steps of:
accessing said memory means with an address counter; and
timing the operation of said memory means with a clock.

29. The method of claim 28 including the step of shifting signals in at least one of said memory means after each sampling interval.

30. The method of claim 25 including the step of computing the encryption algorithm given in the Federal Register Mar. 17, 1975.

31. The method of claim 25 including the step of computing the encryption algorithm of Vernam's cipher.

32. The method of claim 25 including the step of storing the signals in a RAM.

* * * * *